No. 748,694. PATENTED JAN. 5, 1904.
H. J. & J. C. BRANTLEY.
LIQUID MEASURE.
APPLICATION FILED OCT. 25, 1902.
NO MODEL. 3 SHEETS—SHEET 1.
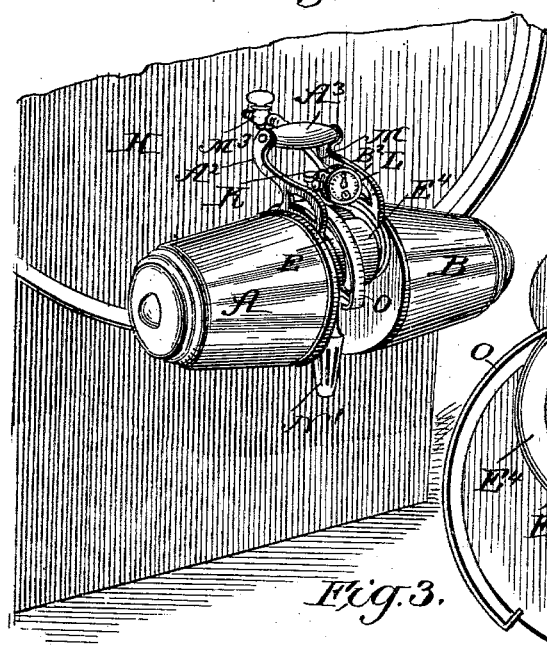
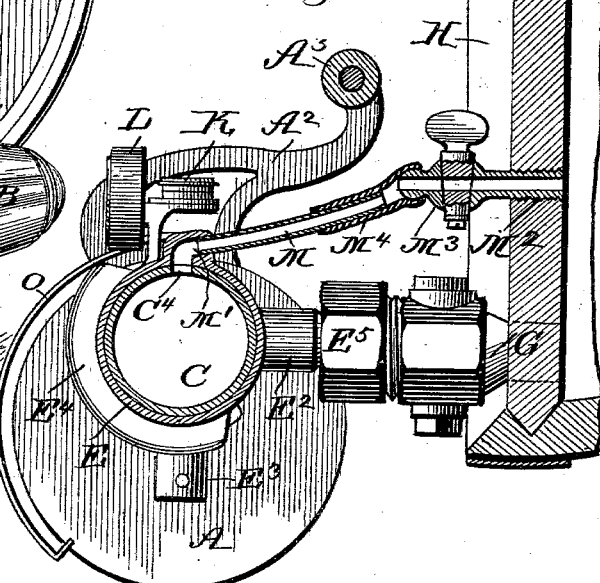
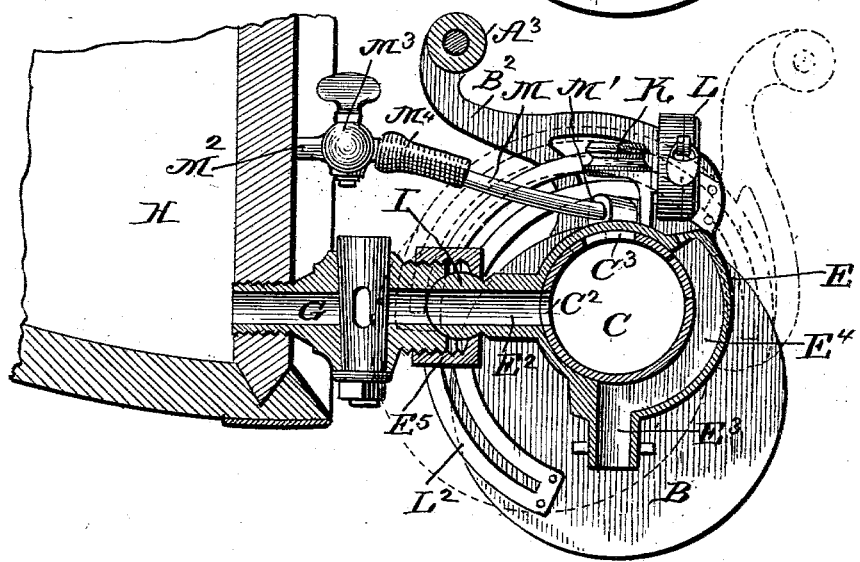
WITNESSES:
Jos. A. Ryan
Perry B. Turpin
INVENTORS
Henry J. Brantley
John C. Brantley
BY Munn & Co.
ATTORNEYS.

No. 748,694. PATENTED JAN. 5, 1904.
H. J. & J. C. BRANTLEY.
LIQUID MEASURE.
APPLICATION FILED OCT. 25, 1902.
NO MODEL. 3 SHEETS—SHEET 2.
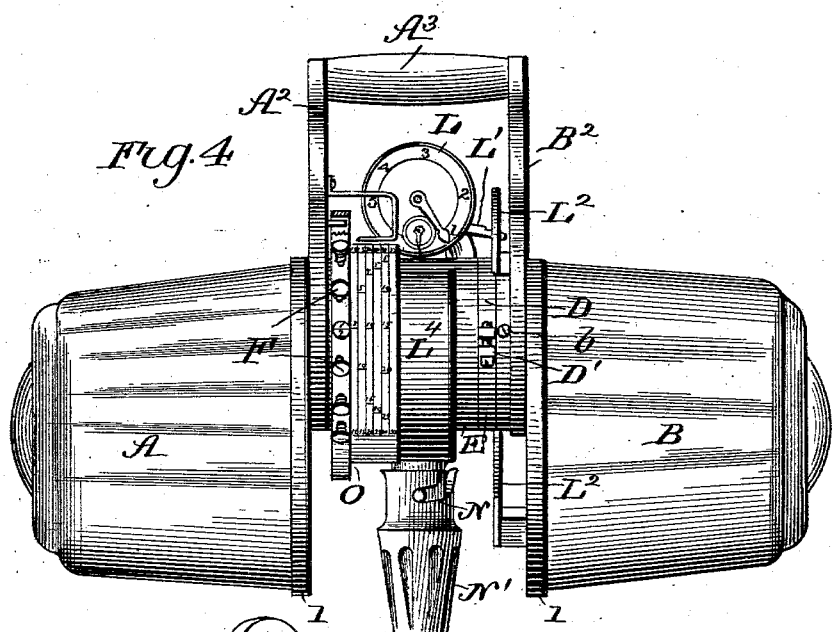
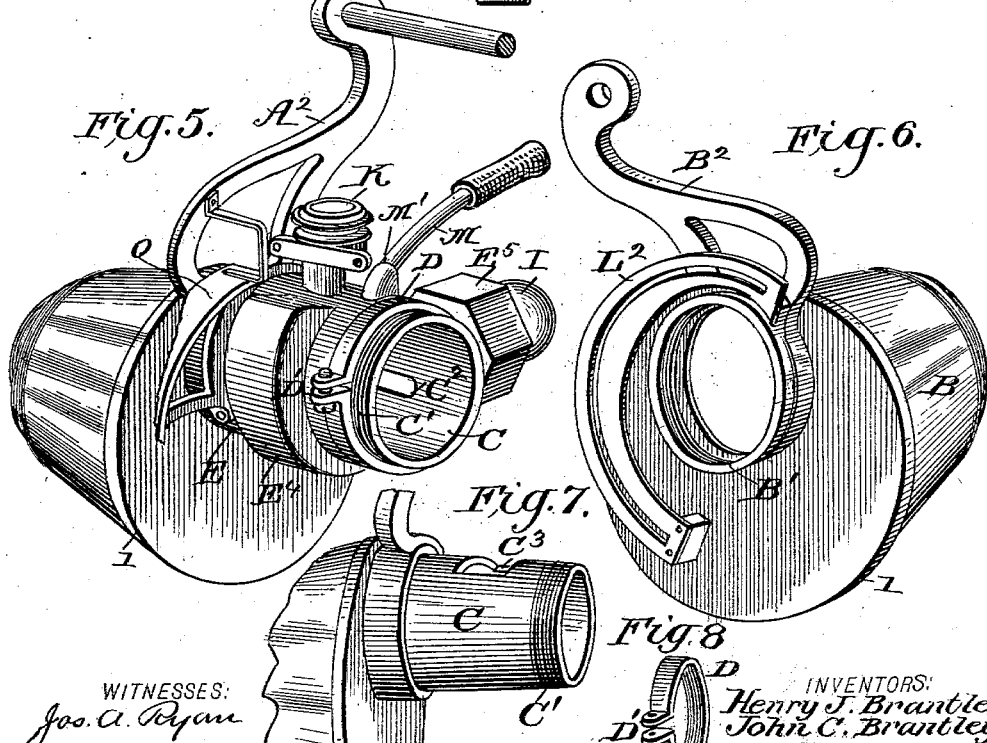
WITNESSES:
Jos. A. Ryan
Perry B. Turpin
INVENTORS:
Henry J. Brantley.
John C. Brantley.
BY Munn & Co.
ATTORNEYS.

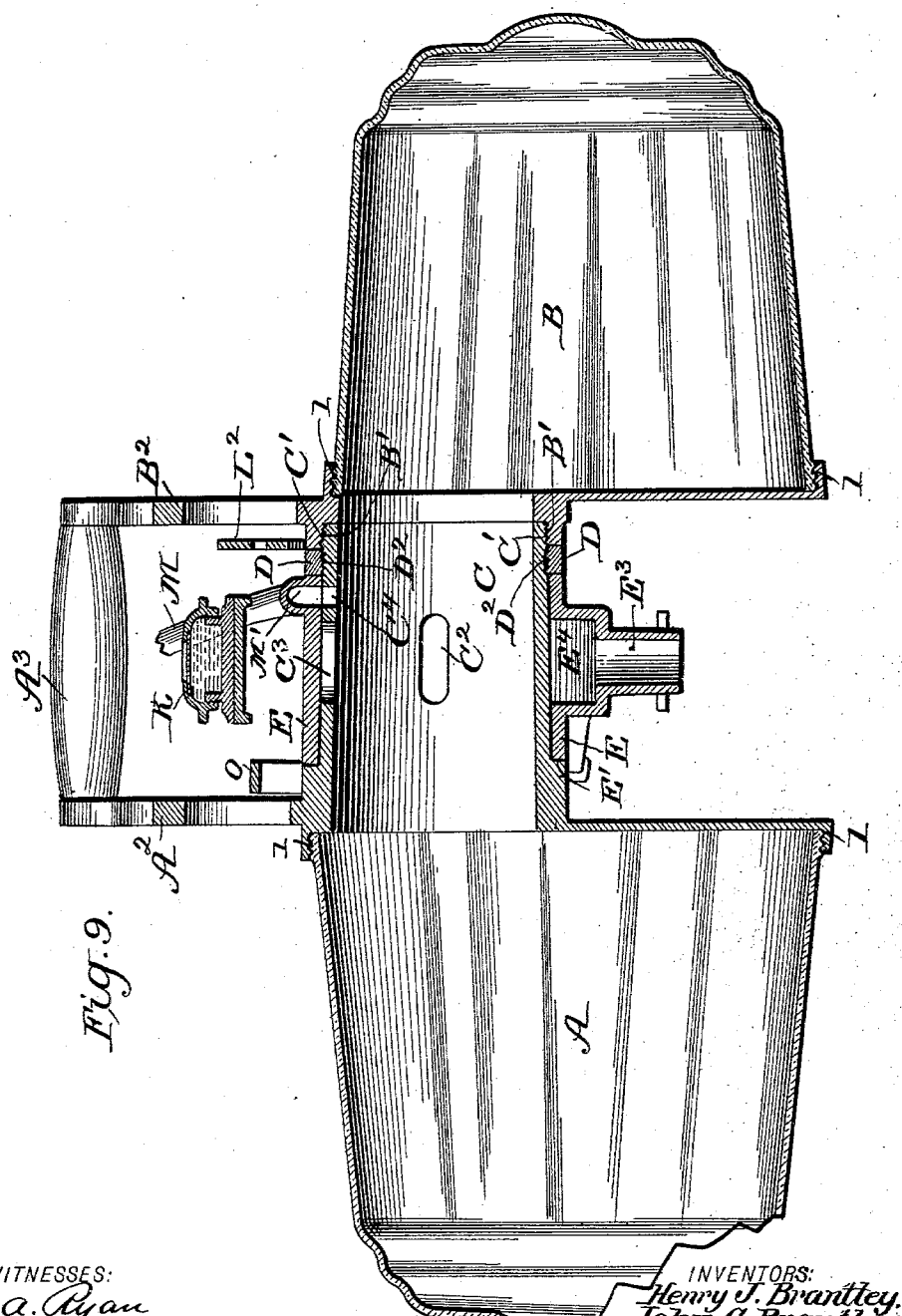

No. 748,694. Patented January 5, 1904.

UNITED STATES PATENT OFFICE.

HENRY J. BRANTLEY, OF VALDOSTA, GEORGIA, AND JOHN C. BRANTLEY, OF MARKSVILLE, MISSISSIPPI.

LIQUID-MEASURE.

SPECIFICATION forming part of Letters Patent No. 748,694, dated January 5, 1904.

Application filed October 25, 1902. Serial No. 128,837. (No model.)

*To all whom it may concern:*

Be it known that we, HENRY J. BRANTLEY, a resident of Valdosta, in the county of Lowndes and State of Georgia, and JOHN C. BRANTLEY, a resident of Marksville, in the county of Holmes and State of Mississippi, citizens of the United States, have made certain new and useful Improvements in Liquid-Measures, of which the following is a specification.

This invention is an improvement in liquid-measures, and particularly in that class of such measures illustrated in an application for patent, Serial No. 8,478, filed by us in the United States Patent Office March 13, 1900; and the present invention relates to improvements in the construction of the measuring vessel, in the connections thereof with the barrel or cask, so the measuring vessel can be leveled when applied for use, in the means for vending the measuring vessel and the cask, and in other improvements, as will be hereinafter referred to; and the invention consists in certain novel constructions and combinations of parts, as will be hereinafter described and claimed.

In the drawings, Figure 1 is a perspective view of our invention applied for use. Fig. 2 is a vertical cross-section of the invention through the vending-pipe. Fig. 3 is a cross-section of the invention through the pipe for supplying liquid to the measuring vessel. Fig. 4 is a front elevation of the measuring vessel, this figure illustrating also a series of spring-pressed stops F for limiting the extent of movement of the measuring vessel. Fig. 5 is a detail perspective view of one section of the measuring vessel having the central section and the cuff or casing applied thereto. Fig. 6 is a detail perspective view of the opposite section of the measuring vessel. Fig. 7 is a detail perspective view of a portion of the section shown in Fig. 5, the cuff being removed. Fig. 8 is a detail perspective view of the adjusting and locking ring for application to the connecting-section of the measuring vessel; and Fig. 9 is a longitudinal section of the measure, as will be described.

In the construction shown in our former application, before referred to, the measuring vessel comprises the end sections and the central connecting-section united permanently together, and the central section is made cylindrical and receives the cuff or casing, which is shown as divided, so it can be applied to the said central section. In the present construction the vessel is composed of the end sections A and B and the central section C, which is secured at one end permanently to the section A (see Figs. 7 and 9) and tapers toward its other end, where it is threaded at C' to receive the ring D, which is split and adjustably connected at D' and is threaded at D², so it can be turned onto the threaded portion C' of the connecting-section C when the parts are applied as shown in Fig. 9. The section B of the measuring vessel has a threaded socket at B', in which is threaded the end C' of the section C, and when the vessel B is threaded on the section C it may be locked fast in position by means of a screw $b$, although this lock may not be absolutely necessary in all cases, as the section B carries one handle-arm, B², and the section A the other handle-arm, A², which in practice are connected by the cross-bar A³, which when the parts are assembled, as shown in Figs. 4 and 9, prevents the sections A and B from turning independently.

The connecting-section C is provided with an inlet-opening at C², through which fluid may be received from the cask when the parts are adjusted to the position shown in Fig. 3, and it also has an outlet-opening C³, which may be turned to discharge to the casing E when the measuring vessel is turned from the position shown in full lines, Fig. 3, to that indicated in dotted lines in the same figure, substantially like the construction shown in our former application before referred to.

The casing E is tapered to fit the tapered connecting-sections C and may be slipped thereon from one end to the position shown in Fig. 5 and may then be secured on the section C by the adjusting and locking ring D, (shown in Fig. 8), said ring being adjusted up against the end of the section E and holding the opposite end of said section at E' against a shoulder formed on the section C, as shown in Fig. 9. This casing, as in our former patent, is provided with a feed-port E² and discharge-port E³ and has an enlarged portion or chamber E⁴, forming an extension of its discharge-port, as in our former application above referred to, and we also provide in the present instance a series of spring-pressed stops F, as in our former application, for limiting the extent of movement of the measuring vessel, according to the amount which it may be desired to measure. By making the casing E tapered and fitting same on the tapered connecting-section C we are able to dispense with separate packing-rings between the casing and the connecting-section and to fit the same together by means of a ground-joint, which may be adjusted from time to time to take up wear and to secure a liquid-tight joint at all times. The casing has its discharge-port communicating with a pipe-section E⁵, which connects with a pipe-section G, leading to the barrel H, by means of a ball-and-socket joint I, which can be adjusted in order to level the measuring vessel after it has been applied to the barrel or cask H. This is important in securing accurate measurements, and in connection with said universal joint I we provide the measuring vessel with a spirit-level K to indicate the true level position of the vessel. By this construction we are able to level the measuring vessel after it has been connected with the cask and are not dependent on the position of the cask or the bore of the hole for the pipe G in a true horizontal line.

The present measure, like the one described in our former application before referred to, is provided with a register L, having a projecting operating-arm L', which is engaged by a cam-slot L² on the measuring vessel, so the register can be operated by the movement of the measuring vessel, as in the construction shown in the prior application referred to.

By our present invention we vent the barrel or cask and the measuring vessel by means of a connecting venting-tube M, which connects with the casing at M' and with the barrel at M² and may preferably have a valve M³ and a flexible coupling M⁴, as shown in Fig. 3. The connection at M' is closed at all times by the section C of the measuring vessel, except when such vessel is adjusted to the position shown in Fig. 3. At such time the air in the vessel may be passed through the port C⁴ and thence through the pipe M into the barrel H, thus venting into the barrel air from the measuring vessel corresponding to the liquid drawn into said vessel from the barrel. The instant the measuring vessel is adjusted forward from the position shown in Figs. 2 and 3 to that indicated in dotted lines, Fig. 3, the port C⁴ will pass out of register with the pipe M and the latter will be closed before the measuring vessel reaches the position in which its port C³ will discharge to the extension E⁴ of the casing. It will be noticed, therefore, that we provide for venting the measuring vessel directly from the barrel or cask from which the liquid is being dispensed and avoid any vent in connection with the barrel, which will be open at all times, and so result in a waste of liquid.

The discharge-pipe E³ of the casing may connect by a bayonet-joint N or otherwise with a tube N', tapered to fit in the mouth of a jug or bottle.

In our present apparatus, as in the one described in our former application referred to, we provide at O a computing-table fixed in connection with the casing and which is registered by a pointer O', carried by the measuring vessel, so the distance to which the said measuring vessel must be moved to secure the discharge of the liquid of certain values can be readily ascertained.

It may be preferred to make the body portion end sections A and B of the measuring vessel of glass, threaded at 1 to the end plates. (See Fig. 9.)

Having thus described our invention, what we claim as new, and desire to secure by Letters Patent, is—

1. An apparatus substantially as described consisting of the measuring vessel composed of the end section provided at one end with the connecting-section tapered toward its free end, the opposite end section threaded on the reduced end of the connecting-section, the casing fitting on the connecting-section, the adjusting and locking ring threaded on the reduced end of the connecting-section up against the casing, said casing being provided with a spirit-level, and a pipe for connecting the casing with the barrel or cask said pipe being made in sections having a universal joint, and a vent-tube for connecting the measuring device with the barrel or cask substantially as set forth.

2. The combination in a liquid-measure of the measuring vessel having opposite end sections and an intermediate or connecting section, the casing fitting over the connecting-section of the measuring vessel and provided with means for connection with the barrel or cask whereby to supply liquid to the measure, and a venting-tube connected with said casing and adapted to connect same with the barrel or cask whereby the barrel or cask may be vented through the measuring device substantially as set forth.

3. A liquid-measure provided with a tube for connection with a barrel or cask said tube being made in sections connected by universal joint, whereby the vessel may be leveled after its application to the barrel or cask substantially as set forth.

4. A liquid-measure having a pipe connection with the barrel or cask, said connection being made in sections united by universal joint and provided with a venting-tube for connecting the measuring device with the cask said venting-tube having a flexible section to permit the leveling of the measure after its application to a cask substantially as set forth.

5. The combination in a liquid-measure of the measuring vessel having the opposite end sections and the intermediate or connecting section provided with ports through which liquid may be supplied and discharged and a venting-port, and the casing fitting over the ported intermediate or connecting section of the liquid-measure and having ports through which liquid may be supplied and discharged and also having a venting-port with which the venting-port of the measuring vessels registers, and a venting-pipe leading from such port for connection with the cask or barrel substantially as set forth.

6. In an apparatus substantially as described a measuring vessel composed of an end section, a tapered connecting-section secured at its larger end to said end section, and an opposite end section secured on the smaller end of the tapered section, and a casing fitting on the connecting-section between the opposite end sections substantially as set forth.

7. In an apparatus substantially as described a measuring-section composed of an end section, a connecting-section united at one end with said end section, an end section fitting on the other or free end of the connecting-section, a casing encircling the connecting-section and having supply and delivery ports and connections between the end sections whereby to unite the same independently of the central connecting-section substantially as set forth.

8. The combination with the end section having the projecting connecting-section and the handle-arm of the opposite end section fitting on the free end of the connecting-section and provided with a handle-arm and connections between the handle-arms and the supply and delivery mechanism substantially as set forth.

HENRY J. BRANTLEY.
JOHN C. BRANTLEY.

Witnesses to the signature of Henry J. Brantley:
EDWARD HARSHAW,
C. LEROY TRIPMAKER.

Witnesses to the signature of John C. Brantley:
G. P. WATSON,
C. L. STRINGFELLOW.